United States Patent [19]

Karashima

[11] Patent Number: 4,652,003
[45] Date of Patent: Mar. 24, 1987

[54] CARRYING CART EQUIPPED WITH SERVICE RACK AND STEPLADDER

[76] Inventor: Masashi Karashima, 88-5, Nakano, Ebina-shi, Kanagawa-ken, Japan

[21] Appl. No.: 727,394

[22] Filed: Apr. 25, 1985

[51] Int. Cl.[4] .................................................. B62B 5/04
[52] U.S. Cl. ..................................... 280/166; 182/15; 182/97; 182/127
[58] Field of Search ............... 280/166, 163, 33, 99 H; 182/127, 97, 95, 96, 129, 15, 17, 33.6, 176; 105/443, 447, 448

[56] References Cited

U.S. PATENT DOCUMENTS

| | | | |
|---|---|---|---|
| D. 163,604 | 6/1951 | Hoey | 280/166 |
| 2,377,043 | 5/1945 | Samuelson | 280/166 |
| 2,521,114 | 9/1950 | Campbell | 182/176 |
| 2,827,215 | 3/1958 | Burg | 228/6 |
| 3,020,972 | 2/1962 | Hocket | 182/15 |
| 3,556,248 | 11/1971 | Brown | 182/96 |
| 4,174,021 | 11/1979 | Barlock | 280/163 |

FOREIGN PATENT DOCUMENTS 866178 4/1961 United Kingdom .

Primary Examiner—John J. Love
Assistant Examiner—Michael Mar
Attorney, Agent, or Firm—Wenderoth, Lind & Ponack

[57] ABSTRACT

A service cart assembly including a cart having a lower base equipped with a plurality of rollers or wheels thereunder and a plurality of posts erected standing upright from the lower base with a top plate installed thereupon, and a stepladder built in the cart having a rear leg element fixed rigidly to the rear end portion of a top plate of said stepladder and having a front leg element connected pivotally to the front end portion thereof. The step ladder further includes a connecting arm assembly connected pivotally at the rear end thereof to the lower base of the cart and at the front end thereof to the rear leg element of the stepladder, and a latch mechanism for engagement with the top step of the stepladder mounted on the front pair of the posts standing upright from the cart.

13 Claims, 8 Drawing Figures

CARRYING CART EQUIPPED WITH SERVICE RACK AND STEPLADDER

BACKGROUND OF THE INVENTION

1. Field of the Invention

The present invention relates generally to an improvement in or relating to a wheeled cart or wagon, and more particularly to an improvement relating to a wheeled cart or wagon for carrying goods, which is equipped with a service rack or stand for helping the supply personnel lift the commodity to higher points of sales counters or shelves.

2. Description of the Prior Art

In general, there is an increase in the quantity and variety of commercial goods for sale at the upper markets and at the individual retail stores. With this trend, it is seen that the heights of the showcases or like display stands are generally growing higher.

Accordingly to such increasing heights of the showcases and the like sales aids to be placed in the spaces for sales operations at these markets or stores, it would naturally be required to concurrently provide carts or wagons for carrying the goods to be sold at the points of sales together with certain means such as stepladders for the supply personnel to aid them in placing such goods to higher points of these sales aids.

Referring now to FIGS. 1 and 2, there is shown a typical example of the conventional wheeled cart or wagon of the type as noted above, in which there is provided a stepladder or the like structure (a) with its one end being connected pivotally and directly to a part of the carrying cart (b) and with its other end extending as standing leg portions (c), and which is constructed in such a manner that this stepladder structure may be rotated as a whole around a pivot point (d) on the cart (b), and that this structure (a) may be collapsed or folded to a smaller volume into the interior of the cart (b) when it is not in service as typically shown in FIG. 1, while in service the ladder structure (a) may be extended outwardly from the cart (b) as shown in FIG. 2.

Now, when using the stepladder structure (a) as noted above, it is seen that part of the weight working upon the structure (a) is added upon the service cart (b) through the pivot connection (d), and then the service cart (b) would very possibly become unstable as pairs of wheels (e) and (f) of the service cart (b) would rotate back and forth, thus resulting in a dangerous condition such that the service personnel standing upon the stepladder structure (a) for supplying and/or removing the goods could fall from the stepladder upon the sales aids or even onto the goods displayed at the showcases or the like.

In consideration of such hazardous service conditions, there has been proposed the provision of a wheel brake to work upon the pair of wheels (e), but this counter-measure would not necessarily work well since there would stil remain a risk that the other pair of wheels (f) would possibly move around, thus causing a like risky condition of the device.

The present invention is essentially directed to the provision of an effective solution of such inconveniences and risky conditions in use of such devices as outlined hereinbefore and experienced in the use of the conventional carrying carts or wagons.

SUMMARY OF THE INVENTION

It is therefore a primary object of the present invention to provide an improvement in the service cart or wagon, which is essentially adaptable to the general locations of sales at the supermarkets or the like retain stores overcoming such drawbacks characteristic of the conventional service carts or wagons, and in which there is provided an improved service cart assembly including a cart having a lower base equipped with a plurality of rollers or wheels thereunder and a plurality of posts erected standing upright from the lower base with a top plate installed thereupon, and a stepladder built in the cart having a rear leg element fixed rigidly to the rear end portion of a top step of said stepladder and having a front leg element connected pivotally to the front end portion of said top step; which comprises connecting arm means connected pivotally at the rear end thereof to the lower base of the cart and at the front end thereof to the rear leg element of the stepladder, and latch means for engagement with the top step of the stepladder mounted on the front pair of the posts standing upright from the cart complete.

With the advantageous construction of the service cart according to the present invention as noted above, this cart may readily be used in such a manner that upon releasing the engagement of a top step of the stepladder with a latch element provided on one front post of the cart, the stepladder may be rotated as a whole about a pivot means for a connecting rod attached to the lower base of the cart so that it can be extended in front of the cart for service, and then the stepladder may stand on itself independently from the service cart upon its own front and rear legs resting immediately on the floor surface, thus ensuring a stable state of standing as typically shown in FIG. 3.

Next, referring to the case for collapsing the stepladder out of service, it can afford such a ready handling that it is manually rotatable as a whole about the pivot axis mounted upon the lower base of the cart for the connecting rod as noted above, after which the top step of the stepladder may readily be put in engagement with the latch element provided on the front post of the service cart. At this moment, the base of the stepladder and a pair of rear legs fixed thereto may be placed back into the frontal space defined between a pair of wheels of the cart, with the front leg elements of the stepladder which are connected pivotally to the front end of the top step suspended vertically by gravity near the front post of the cart, and which also take their position near the rear leg elements, accordingly.

As a consequence, there may be ensured a substantial enough space for service in the lower area of the service cart.

These and other advantages and objects of the invention can be understood better from the following detailed description of an improved service cart equipped with a built-in stepladder structure in accordance with the present invention to be described with reference to the accompanying drawings, in which like parts are designated by like reference numerals.

DETAILED DESCRIPTION OF THE PREFERRED EMBODIMENT

The present invention will now be described in detail by way of example of a preferred embodiment thereof in conjunction with the accompanying drawings, as follows.

Figure 1:
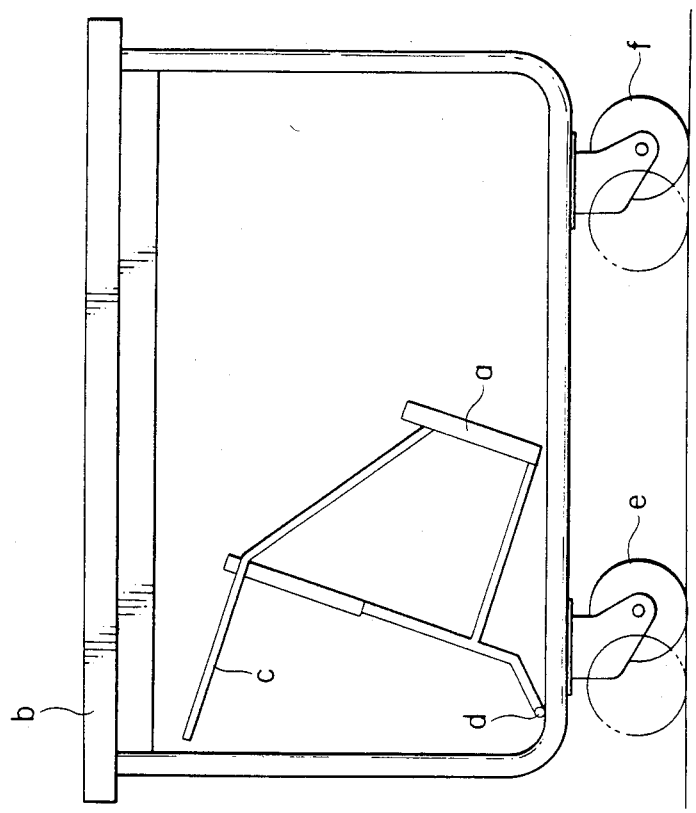
FIGS. 1 and 2 are schematic elevational views showing the general construction of a typical conventional cart, with its stepladder stored in a collapsed position and extended in a service position, respectively.
Figure 2:
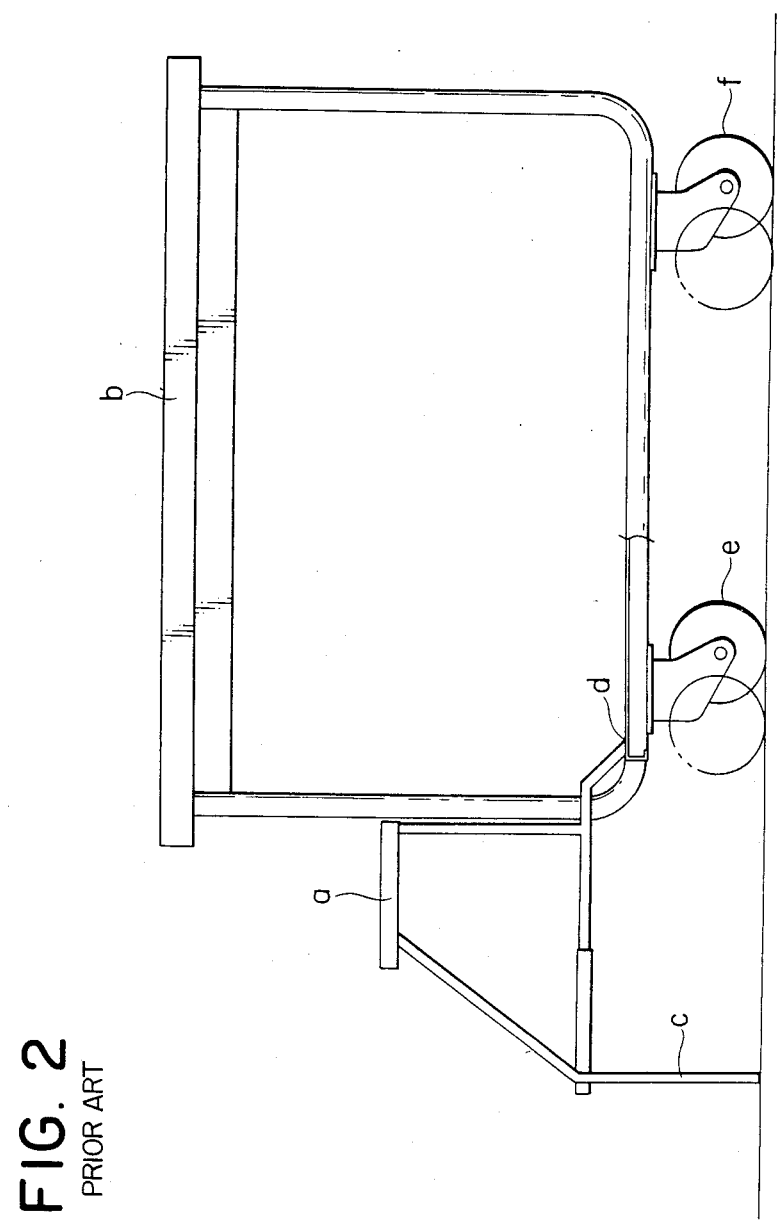
Figure 3:
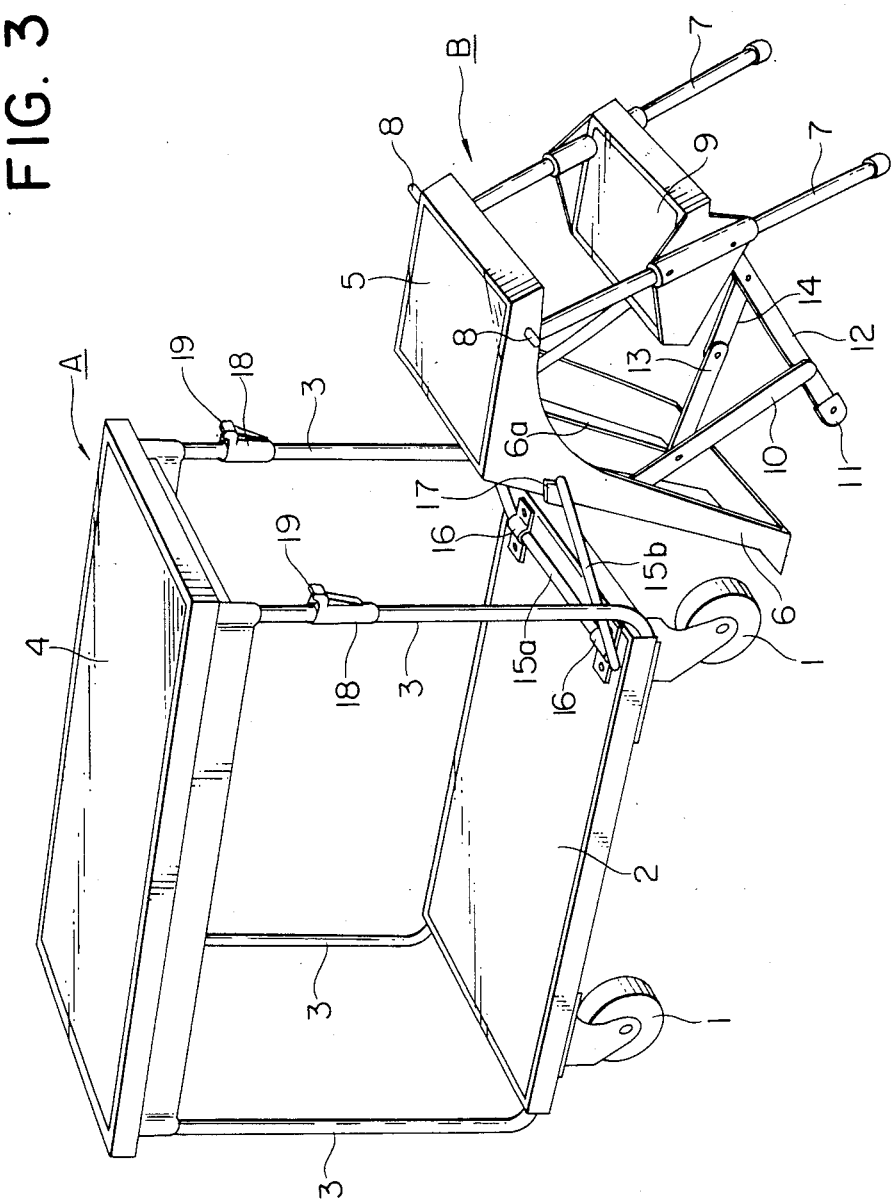
FIG. 3 is a perspective view showing the general construction by way of a preferred embodiment of the invention.
Figure 4:
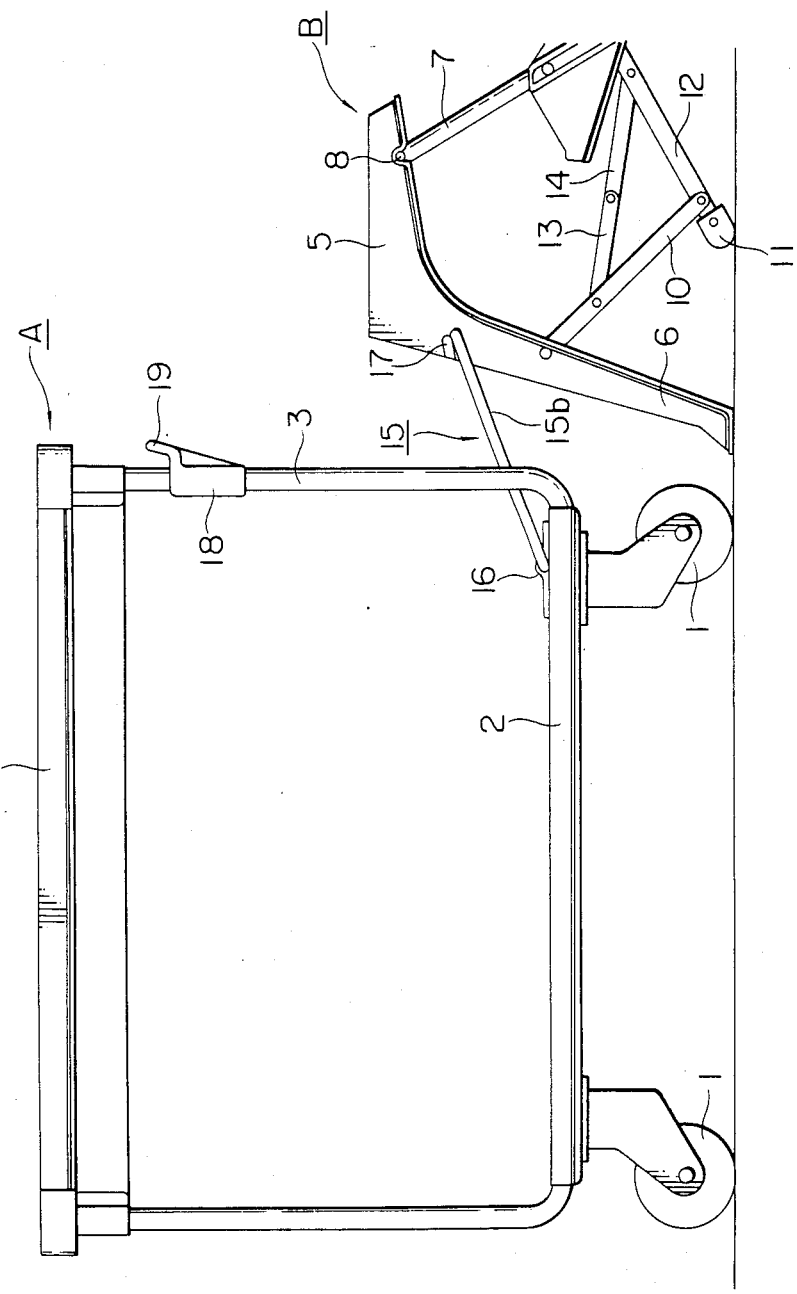
FIG. 4 is a side elevational view showing the same cart according to the invention.
Figure 5:
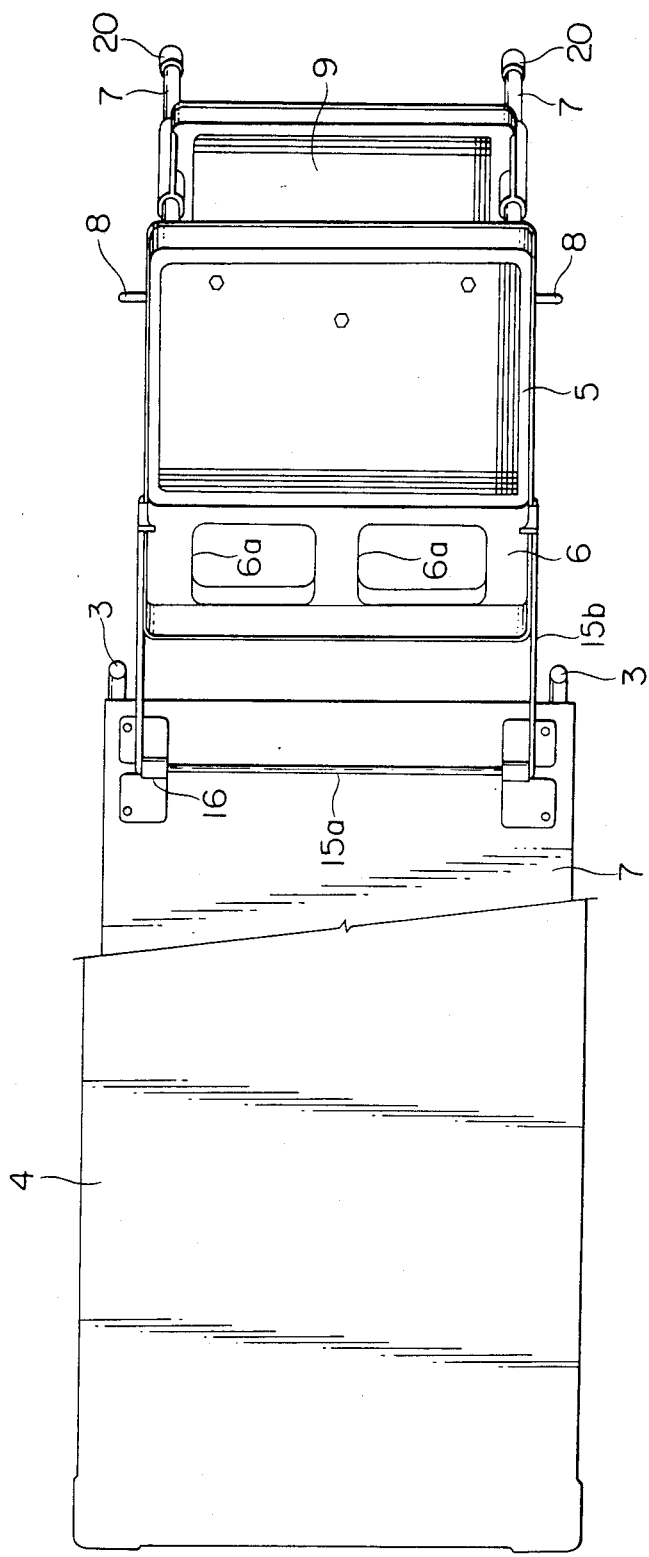
FIG. 5 is a top plan view, partly cut-away, showing the same chart.
Figure 6:
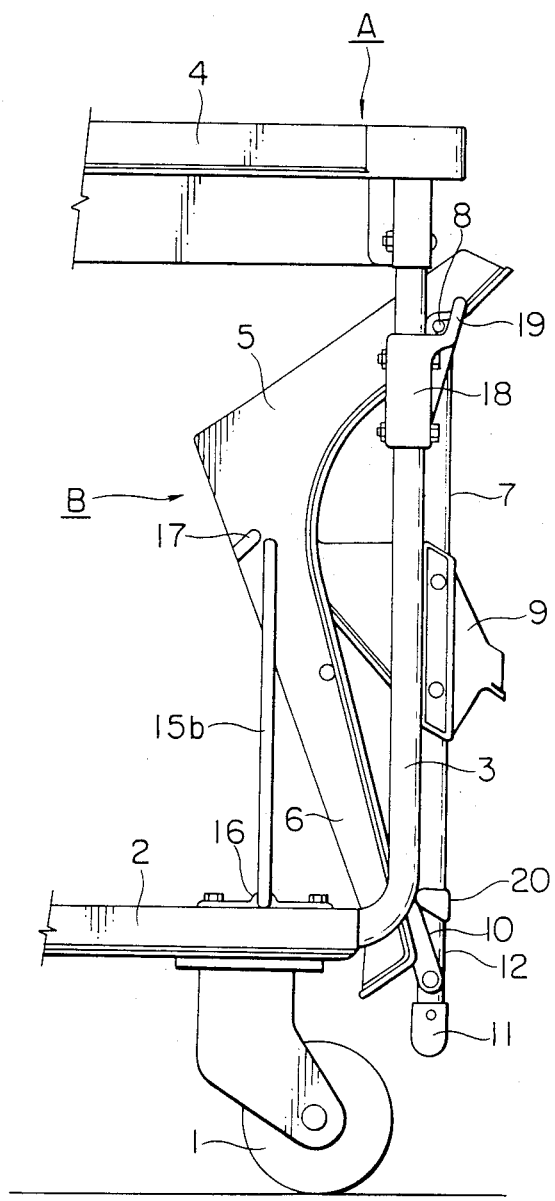
FIGS. 6 through 8 are fragmentary elevational views showing the sequence of extending the stepladder to service according to the present invention from its collapsed state to its extended position.
Figure 7:
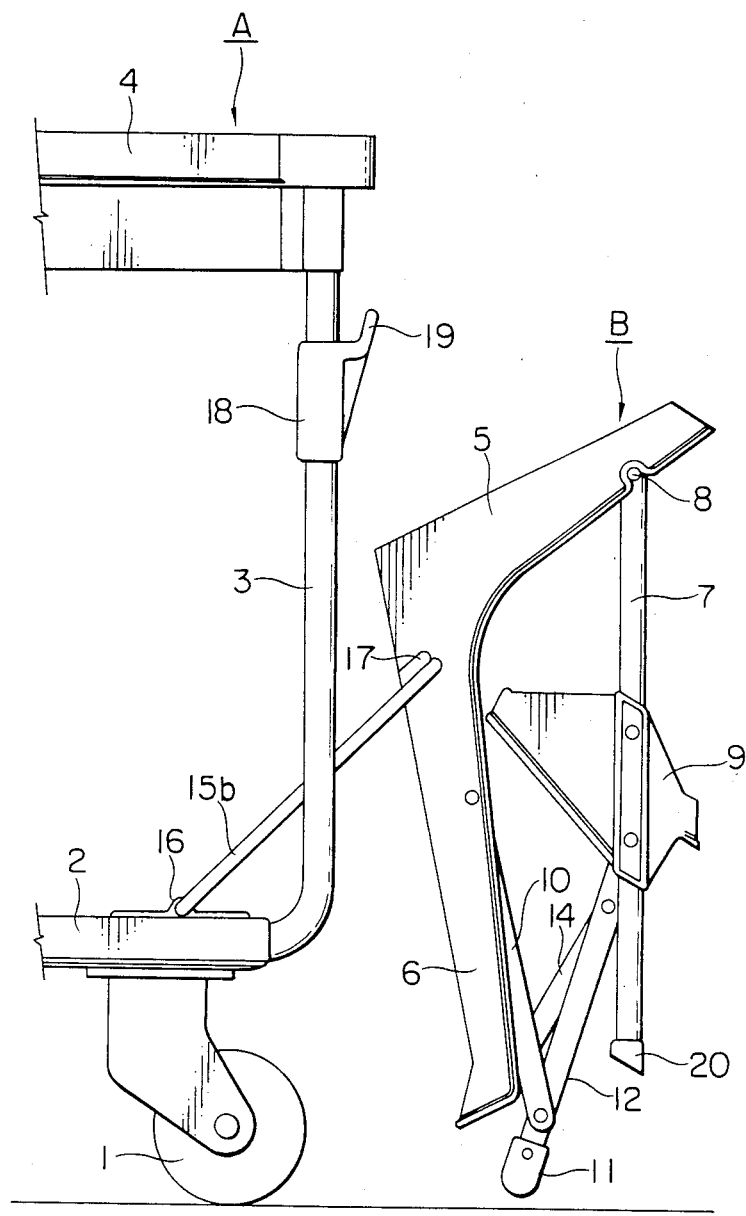
Figure 8:
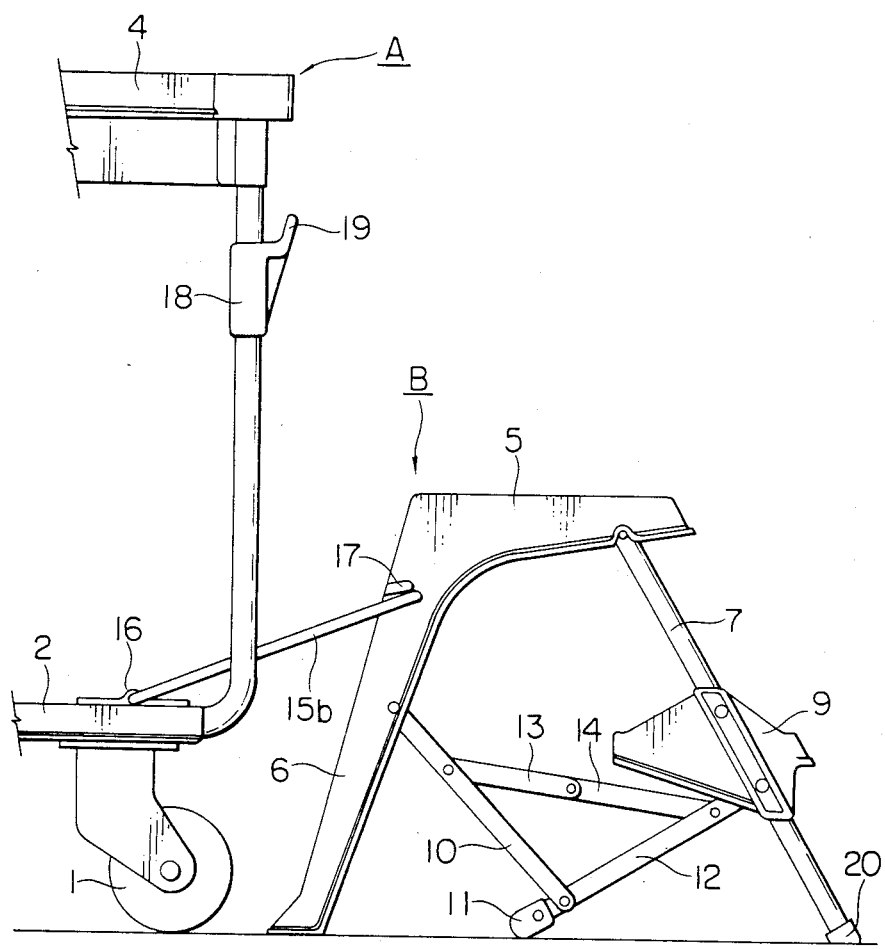

Now, referring initially to FIGS. 3 and 4, there is shown, by way of a preferred embodiment of the present invention, the general construction of an improved service cart which comprises a cart designated generally at the reference A, four posts designated at 3 standing vertically upwardly from a lower base 2 under which there are installed rotatable wheels 1, and top cover plate 4 supported by the four posts 3.

Also shown is a stepladder designated generally at the reference B including a top step 5, from the rear end of which there is extending a rear leg element 6 formed as a unit, and with the front end of which there are connected pivotally a pair of front leg elements 7. There is seen inserted pivotally a rotatable shaft designated at 8 extending beyond the lateral sides of the top step 5, to which shaft 8 the pair of front leg elements 7 are securely connected. In addition, a step board 9 is rigidly mounted across each of the paired front leg elements 7. Also, an opening 6a is provided in the rear leg element 6 for the purpose of reducing the weight thereof.

To each of the side wall portions of the rear leg element 6 there is leg spreading means pivotally connected the upper end of a rear stay 10 and each front leg element is pivotally connected to an intermediate portion of a front stay 12. Each front stay 12 is pivotally connected to a respective rear stay 10 and at the lower end of each of paired front stays 12 there is installed a bottom cap 11 made, for example, of a synthetic resin, rubber, or the like. The upper end of each front stay is pivotally connected to a respective one of the paired front leg elements 7, and also it is seen that the opposite ends of stay locking elements 13, 14 connected pivotally with each other at their one ends are pivoted at their other ends to the rear stay 10 and the front stay 12, respectively.

It is also shown that there is provided a U-shaped connecting arm 15, with its horizontal web portion 15a being mounted rotatably in position on the lower base 2 of the cart by means of a pair of metal bearings 16 fixed securely thereon, and with side leg portions 15b thereof and from the horizontal web portion 15a extending in pivotal engagement at leading bent portions of the side leg portions 15b with the side wall portions of the rear leg element 6.

Also, a stopper 17 is provided on each of the side wall portions of the rear leg element 6, upon which the upper surfaces of the side leg portions 15b may abut when the front and rear legs of the stepladder are placed upon a floor surface, as shown in FIG. 4.

In addition, a latch element 18 is rigidly fitted on each of the front posts 3 of the cart A for latching engagement with the top step 5 of the stepladder, and latch element 18 includes a hook 19 which engages with the lateral extension of the rotating shaft 8 projecting laterally outwardly beyond the side walls of the top step 5.

Shown at 20 in FIGS. 5–8 is a bottom cap to be installed on the lower end of each of the paired front leg elements 7, which is preferably made of a synthetic resin, rubber or the like.

Now, the present invention will be described in connection with the operation. By virtue of such an advantageous construction of the carrying cart equipped with the built-in stepladder according to the present invention as described fully by way of a preferred embodiment thereof, when the service cart arrives at a desired location of loading or unloading services, a user will grasp and pull toward him the front edge portion of the top step 5 of the stepladder B so that it may move in rotation counter-clockwise about the bent portions or angled pivot extensions of the side leg portions 15b of the U-letter shaped connecting arm 15, thus releasing the engagement of the lateral projections from the rear leg element 6 with the hooks 19 of the catch elements 18 mounted on the posts 3. Further pulling of the stepladder assembly B toward the front side of the service cart A will move the entire stepladder in clockwise rotation about the pivot connection of the horizontal leg 15a of the connecting arm 15 with respect to the lower base 2 of the service cart A (see FIG. 7). At the same time the rear leg element 6 of the stepladder B shifts in position and the paired front leg elements 7 rotate counter-clockwise about the pivot connection of shaft 8 with respect to the top step 5 of the stepladder until the bottom caps 20 of their lower ends of leg elements 7 contact with the ground. Along with this motion of the stepladder members, both front and rear stays 10 and 12 will expand by themselves, until the bottom caps 11 of the front stays 12 land onto the floor surface, and simultaneously the stay locking members 13, 14 will extend to be generally straight with each other across the both stays 10, 12 (see FIG. 8).

According to the embodiment of the invention as shown, it is notable that the improved service cart A is equipped with the stepladder B of unique construction such that the stepladder B collapsed on the cart A may immediately be ready for use at the same time as it is extended and set upon the floor surface in front of the service cart A, and more notably, it is constructed such that the stepladder B may be set upon the floor independently from the service cart A so that it can be held in a very stable condition as compared with the conventional ladder structure, thereby preventing the risk of movement of the ladder from occurring during the service operations at the points of sales, accordingly.

In this state, since the stepladder B has both front leg elements 7 held pivotally at the top end thereof to the rear leg element 6, and the stay locking elements 13 and 14 extending to be straight with each other and crossed in the U-shaped fashion with the paired stays 12 and 10, the possibility of over-straddling of the both leg portions 7 and 6 from each other is prevented and the stepladder provides a stable leg-spread state for ensuring the stability of these leg elements even when a large load is placed upon the top step 5 of the ladder.

Next, for the collapsing operation of the stepladder B back to the service cart A, if the front edge portion of the top step 5 is lifted up by the user, it is seen that the stepladder B will turn with its the horizontal leg 15a of the U-shaped connecting arm 15 rotating counter-clockwise about the pivot connection with respect to the lower base 2 of the service cart A and with each lateral projection of the rotating shaft 8 from the side walls of the rear leg element 6 engaged in position with the hook 19 of the latch element 18 mounted on each post 3, respectively.

In this state, the paired front leg elements 7 will be suspended vertically by their own weight from the top step 5 and in a close parallel relationship with the front posts 3 of the service cart A, thus having the stepladder B stored within a small volume back in position in the front part of the service cart A. As a consequence, there is a large area made available for the storage of goods which can be loaded in the bottom surface of the service cart A, accordingly.

Also, as stated hereinbefore, when rotating the stepladder B counter-clockwise around its pivot connection in the collapsing operation thereof, the stoppers 17 mounted on each side of the rear leg element 6 will serve to abut upon the upper face of the both side leg portions 15b of the U-shaped connecting arm 15, thus preventing the stepladder B from a counter-clockwise swinging motion about the leading point of pivot engagement with the side leg portions 15b while being stored in position, and thus ensuring an easy and smooth collapsing operation of the stepladder B.

While the invention has been shown and described specifically by way of the preferred embodiment thereof, it is to be understood that the invention is not intended to be restricted to such embodiment only, but that many changes and modifications may be made in the foregoing teaching without departing from the spirit and scope of the invention.

It is also to be understood that the appended claims are intended to cover all of such generic and specific features particular to the invention as disclosed herein and all statements relating to the scope of the invention, as a matter of language, might be said to fall thereunder.

What is claimed is:

1. A service cart assembly including a cart and a stepladder, comprising:
   a cart having a lower base, a plurality of rollers rotatably supported on said lower base, a plurality of posts extending upwardly form said lower base and a top plate supported on said posts above said lower base;
   a stepladder having a top step, at least one front leg element pivotally connected to a front portion of said top step, at least one rear leg element fixed rigidly to a rear portion of said top step;
   means connecting said stepladder to said cart for pivotal movement of said stepladder from a collapsed condition in said cart substantially between said lower base and said top plate to an expanded condition with said front leg element and said rear leg element in contact with a support surface and said rear leg element being between said front leg element and said cart, said connecting means including at least one connecting arm which is pivotally connected at one end thereof to said lower base of said cart and at the other end thereof to said rear leg element of said stepladder;
   means for latching said stepladder in a collapsed condition into said cart, said latching means releasably engaging at least one front post of said cart with said top step of stepladder;
   stopper means mounted on said at least one rear leg element of said stepladder for abutting against an upper surface of said connecting arm for stabilizing said step ladder while in an expanded condition.

2. The service cart assembly of claim 1, further comprising at least one rear stay and at least one front stay, said rear stay pivotally connected at an upper rear end thereof to said rear leg element and at a lower front end thereof to a lower rear end of said front stay, said front stay pivotally connected at an upper front end thereof to said front leg element.

3. The service cart assembly of claim 2, wherein a cap of rubber or synthetic resin is disposed on said lower rear end of said front stay for engaging a support surface and urging said front and rear stays apart when said stepladder is placed on a support surface.

4. The service cart assembly of claim 2, further comprising stay locking means for locking said front and rear stays in an expanded condition, said stay locking means including a rear stay locking element and a front stay locking element, said rear stay locking element pivotally connected at a rear end thereof to said rear stay and at a front end thereof to a rear end of said front stay locking element, said front stay locking element pivotally connected at a front end thereof to said front stay.

5. The service cart assembly of claim 1, further comprising rotating shaft means including a rotatable shaft having opposite ends thereof projecting from opposite side wall surfaces of said top step of said stepladder, said opposite ends of said rotating shaft being engageable with said latch means when said stepladder is collapsed into said cart.

6. The service cart assembly of claim 1, wherein a pair of front leg elements are pivotally connected to said top step of said stepladder and a step board means extends across said pair of front leg elements.

7. The service cart assembly of claim 1, wherein a pair of rear leg elements are rigidly connected to said top step of said stepladder and said connecting means includes a pair of connecting arms, each of said connecting arms being pivotally connected at one end thereof to said lower base of said cart and at the other end thereof to a respective one of said rear leg elements.

8. The service cart assembly of claim 7, wherein stopper means are mounted on each of said rear leg elements for abutting an upper surface of each of said connecting arms.

9. The service cart assembly of claim 7, wherein a pair of front leg elements are pivotally connected to said top step of said stepladder and further comprising a pair of front stays and a pair of rear stays pivotally connected between said front leg elements and said rear leg elements, each of said rear stays pivotally connected at an upper end thereof to a respective one of said rear leg elements and at a lower front end thereof to a lower end of a respective one of said front stays, said front stays pivotally connected at an upper front end thereof to a respective one of said front leg elements.

10. The service cart assembly of claim 9, wherein a cap of rubber or synthetic resin is disposed on the lower rear end of each of said front stays for engaging a support surface and urging said pair of front and rear stays apart when said stepladder is placed on a support surface.

11. The service cart assembly of claim 9, further comprising stay locking means for locking said front and rear stays in an expanded condition, said stay locking means including a pair of rear stay locking elements, each of said rear stay locking elements pivotally connected at a rear end thereof to a respective one of said rear stays and at a front end thereof to a rear end of a respective one of said front stay locking elements, said front stay locking elements pivotally connected at a front end thereof to a respective one of said front stays.

12. A service cart assembly which comprises:
   a cart having a lower base equipped with a plurality of rollers or wheels thereunder for engaging a support surface and a front and rear pair of posts erected standing upright from the lower base with a top plate installed thereupon;
   a stepladder built in the cart having a rear leg element rigidly fixed to the rear end portion of a top step of said stepladder and having a front leg element pivotally connected to the front end portion of the top step, whereby the rear leg element is between the front leg element and the cart when the stepladder is in an expanded condition with the front and rear leg elements engaging the support surface;
   connecting arm means pivotally connected at the rear end therof to the lower base of the cart and at the front end thereof to the rear leg element of the stepladder, whereby the stepladder can be supported in a folded condition substantially between the top plate and the lower base of the cart;
   latch means mounted on the front pair of posts standing upright from the cart for engagement with the top step of the stepladder when the stepladder is in the folded condition adjacent the front pair of posts;
   at least one rear stay pivotally connected to a front stay, said rear stay pivotally connected at an upper rear end thereof to the rear leg element and at a lower front end thereof to a lower rear end of the front stay, the front stay pivotally connected at an upper front end thereof to the front leg element; and stay locking means including a rear stay locking element and a front stay locking element, the rear stay locking element pivotally connected at a rear end thereof to the rear stay and at a front end thereof to a rear end of the front stay locking element, the front stay locking element pivotally connected at a front end thereof to the front stay.

13. A service cart assembly which comprises:
   a cart having a lower base equipped with a plurality of rollers or wheels thereunder for engaging a support surface and a front and rear pair of posts erected standing upright from the lower base with a top plate installed thereupon;
   a stepladder built in the cart having a rear leg element rigidly fixed to the rear end portion of a top step of said stepladder and having a front leg element pivotally connected to the front end portion of the top step, whereby the rear leg element is between the front leg element and the cart when the stepladder is in an expanded condition with the front and rear leg elements engaging the support surface;
   connecting arm means pivotally connected at the rear end thereof to the lower base of the cart and at the front end thereof to the rear leg element of the stepladder, whereby the stepladder can be supported in a folded condition substantially between the top plate and the lower base of the cart;
   latch means mounted on the front pair of posts standing upright from the cart for engagement with the top step of the stepladder when the stepladder is in the folded condition adjacent the front pair of posts; and
   a rotating shaft means including a rotatable shaft having opposite ends thereof projecting from the side wall surfaces of the top step of the stepladder in such a manner that the projecting ends of the rotatable shaft may rest engaging with the latch means mounted on the front pair of posts standing upright from the cart.

* * * * *